United States Patent [19]

Löffelholz et al.

[11] Patent Number: 5,405,982
[45] Date of Patent: Apr. 11, 1995

[54] POLYMERIC BOROSILAZANES AND ALUMINOSILAZANES, A PROCESS FOR THEIR PREPARATION AND THEIR USE

[75] Inventors: Josua Löffelholz; Martin Jansen, both of Bonn, Germany

[73] Assignee: Bayer AG, Leverkusen, Germany

[21] Appl. No.: 157,814

[22] Filed: Nov. 24, 1993

[30] Foreign Application Priority Data

Dec. 8, 1992 [DE] Germany .................. 42 41 288.9

[51] Int. Cl.$^6$ ............................ C07F 7/08; C07F 5/02; C07F 5/06
[52] U.S. Cl. ................................... 556/173; 556/402; 501/99; 501/96; 501/97; 501/127; 501/153; 501/154; 427/199; 427/397.7
[58] Field of Search ............... 556/402, 173; 501/94, 501/96, 97, 127, 153, 154; 427/199, 397.7

[56] References Cited

U.S. PATENT DOCUMENTS

| | | | |
|---|---|---|---|
| 4,946,809 | 8/1990 | Paciorek et al. | 556/173 |
| 4,987,201 | 1/1991 | Riccitiello et al. | 556/402 X |
| 5,030,744 | 7/1991 | Funayama et al. | 556/402 |
| 5,086,037 | 2/1992 | Hitotsuyanagi et al. | 505/1 |
| 5,162,558 | 11/1992 | Ardaud et al. | 556/402 |
| 5,233,066 | 8/1993 | Jansen et al. | 556/402 |

FOREIGN PATENT DOCUMENTS 0389084 9/1990 European Pat. Off. .
0424082 4/1991 European Pat. Off. .

OTHER PUBLICATIONS

Orbit Abstract of J63256587 (Feb. 4, 1992).
Ceramic Bulletin, vol. 69, No. 11, 1990, Aluminum Nitride: A Versatile but Challenging Material, pp. 1801–1812.

*Primary Examiner*—Paul F. Shaver
*Attorney, Agent, or Firm*—Connolly and Hutz

[57] ABSTRACT

The present invention relates to polymeric boro- and aluminosilazanes corresponding to the general formula $$[(SiL_2)_a(AlL_2)_{1-a}L_2]_x$$

and $$[(SiL_2)_a(BL)_{1-a}L_2]_x,$$

wherein
  a=0–1
wherein
  L means half a bridging —NR-group, or an organoamino (—NR) group, when L is attached to a silicon or aluminum atom, and wherein L means a hydrogen atom, half a bridging —NR— group or an organoamino (—NR) group, when L is attached to a boron atom, in which each silicon and aluminum atom is triply coordinated by four nitrogen atoms and each boron atom by at least two nitrogen and at most one hydrogen atom, a process for the preparation of these polymers and their use as precursor compounds for ceramic high performance materials.

15 Claims, No Drawings

POLYMERIC BOROSILAZANES AND ALUMINOSILAZANES, A PROCESS FOR THEIR PREPARATION AND THEIR USE

The present invention relates to polymeric boro and aluminosilazanes corresponding to the general formula $$[(SiL_2)_a(AlL_2)_{1-a}L_2]_x$$

and $$[(SiL_2)_a(BL)_{1-a}L_2]_x$$

wherein
a=0–1
L means half a bridging —NR— group, or an organo amino (—NR) group, when attached to a silicon or aluminum atom, and L means a hydrogen atom, half a bridging —NR— group, or an organo amino (—NR) group when attached to a boron atom,
in which each silicon atom and aluminium atom is triply coordinated by four nitrogen atoms and each boron atom by at least two nitrogen and at most one hydrogen atom, to a process for the preparation of these polymers and to their use as precursor compounds for ceramic high performance materials.

An increasing interest has developed in recent years for preceramic polymers which can be converted by pyrolysis into nitridic and carbonitric ceramic materials. The works carried out concentrated mainly on the synthesis of precursors for pure nitrides/carbonitrides of an element such as $Si_3N_4$, AlN, BN, or $Si_3N_4.SiC$.

Silicon nitride is basically very suitable as high performance material for parts subjected to heavy wear such as turbochargers, turbines or linings for combustion chambers on account of its strength and high temperature resistance. Certain properties of this material can be optimised for its subsequent uses by the preparation of mixed ceramics. Thus Ruh et at. [J. Am. Ceram. Soc. 1981, 64, 415) report on boron-silicon nitride mixed ceramics which have greater resistance to thermal shock than pure silicon nitride but reduced strength. Aluminium nitride, on the other hand, has substantially improved thermal conductivity compared with silicon nitride [Ceram. Bull. 1990, 69, 1801]. An account of Si/Al/N ceramic layers with improved abrasive properties is given in JP-A 63 256 587.

Composite and mixed ceramics are conventionally produced by powder technology. Nitrides of the relevant elements are carefully ground down and then sintered. The components are left in the material as discrete phases even after hot pressing at 1750° C. because the diffusion constants in covalent nitrides are negligible even at the higher pressures. Microscopic inhomogeneities therefore occur due to random distribution of the primary particles in spite of careful homogenisation of the starting materials and are in part responsible for the low strengths of the composites. Another deterioration in properties of the material is due to contamination of the educts by the grinding dust which occurs in addition to the oxidic impurities which are in any case present and any added sintering auxiliaries. This manifests itself in defects such as slow growth of cracks, low resistance to thermal shock and reduction in high temperature strength.

A possible method of improving the homogeneity of such ceramics is described in EP-A-389 084 and in EP-A-0 424 082. This improvement is carried out by reacting soluble polymeric silazanes containing functional Si—H and/or Si—N groups with a soluble organic boron compound. Both authors obtain a soluble polyborosilazane which can be pyrolysed to a boron-silicon nitride or boron-carbonitride ceramic. This method, of course, does not result in absolutely homogeneous distribution of boron in the ceramic since a polymeric silazane educt is used which remains as a block during the reaction.

It is an object of the present invention to provide novel polymeric polyalumino or polyborosilazanes which can be prepared simply and in high yields and a process for the preparation of nitridic or carbonitridic ceramics which consist only of Si, Al, N, C or Si, B, N, C. The polymers should enable the properties of the material obtained to be tailor-made for its intended use by enabling the Si/Al or Si/B ratio to be varied within wide limits and they should be capable of being pyrolysed to nitridic or carbonitridic ceramic materials. Further, the polymers should have a homogeneous distribution of elements.

The requirements are fulfilled by the following polymers which constitute the subject of this invention. They consist of polymeric aluminosilazanes corresponding to the following general structural formula $$[(SiL_2)_a(AlL_2)_{1-a}L_2]_x$$

wherein
L means half a bridging —NR-group or an organoamino (—NR) group, in which each Si and Al atom is coordinated by four nitrogen atoms and which are characterised in that each nitrogen atom carries an organic radical R wherein R=$C_1$-$C_6$-alkyl, vinyl or phenyl and x stands for values greater than five.

The invention further relates to polymeric borosilazanes corresponding to the following general structural formula $$[(SiL_2)_a(BL)_{1-a}L_2]_x$$

wherein
a=0–1
L means a hydrogen atom, half a bridging —NR— group or an organoamino, (—NR) group when attached to a boron atom, and L means half a bridging —NR-group or an organoamino (—NR) group when attached to a silicon atom, in which each Si atom is triply coordinated with four nitrogen atoms and each B atom with at least two nitrogen and at most one hydrogen atom, characterised in that each nitrogen atom carries an organic radical R wherein R=$C_1$-$C_6$-alkyl, vinyl or phenyl and x stands for values greater than five.

In a preferred embodiment, the boro- and aluminosilazanes according to the invention have a chloride content of <20 ppm.

The invention also relates to processes for the preparation of the polymeric boro- and aluminosilazanes according to the invention.

To prepare the polymeric borosilazanes, a tetrakis organoaminosilane of the formula $Si(NHR)_4$ wherein R=$C_1$-$C_6$-alkyl, vinyl or phenyl is condensed with $BH_3$ in an organic solvent with elimination of $H_2$, the borane component used being complexly bound $BH_3*Y$ wherein Y may be a Lewis base such as $S(CH_3)_2$, $N(CH_3)_3$, $C_5H_5N$, $S(C_2H_5)_2$, $P(CH_3)_3$, $AsPh_3$, tetrahydrofuran, $O(CH_3)_2$, $O(C_2H_5)_2$ or $CNCH_3$.

To prepare the polymeric aluminosilazanes, a tetrakis-organoaminosilane of the formula $Si(NHR)_4$ wherein $R=C_1-C_6$-alkyl, vinyl or phenyl is condensed with $AlH_3$ in an organic solvent with elimination of $H_2$, the $AlH_3$ component used being polymeric $(AlH_2)_x \cdot Y$ or complexly bound $AlH_3 \cdot Y$ wherein Y may be a Lewis base such as $S(CH_3)_2$, $N(CH_3)_3$, $C_5H_5N$, $S(C_2H_5)_2$, $P(CH_3)_3$, $AsPH_3$, tetrahydrofuran, $O(CH_3)_2$, $O(C_2H_5)_2$ or $CNCH_3$.

In a preferred embodiment, the reaction is initially carried out at a maximum temperature of $-40°$ C. and later at temperatures of from $20°$ to $150°$ C. in an aprotic solvent such as toluene, $C_5-C_8$-alkanes, tertiary mines or ethers. The molar ratio of silazane to alane or borane may be varied within a wide range of $Si/B,Al > 1$, preferably in the range of $Si/B,Al$ from $20:1$ to $1:1$. The reaction with elimination of $H_2$ runs to completion with linkage of the required $Si-N-Al/B$ bond.

The polymers according to the invention are soluble in conventional organic solvents and have molar masses $>800$ g/mol.

The polymers may be directly subjected to various shaping processes in solution, such as spinning to fibres, drawing to form films and the production of coatings by various coating processes (Dip-Coating, Spin-Coating).

The viscosity of the solution can be varied over a wide range by the concentration of the polymer in solution and enables the properties to be optimised as required for the subsequent processing.

For the production of powders, the solvent is preferably removed under vacuum. Other conventional drying processes are also suitable.

The invention thus also relates to the production of ceramic powders, fibres, films or coatings in the system Si/Al/N/C or Si/B/N/C by pyrolysis in an inert or $NH_3$-containing atmosphere at temperatures of from $600°$ to $2000°$ C.

In a preferred embodiment, the polymers are pyrolysed in a stream of $NH_3$ at temperatures of from $800°$ to $1100°$ C. for the synthesis of purely nitridic materials and are subsequently calcined in a nitrogen atmosphere at temperatures of from $1400°$ to $1700°$ C. to remove the remaining hydrogen. For the synthesis of carbonitridic material, the first step of calcination is carried out in a stream of $N_2$. Electron microscopic photographs confirm that the distribution of elements is completely homogeneous at least down to a lateral dimension of 0.5 μm.

The invention is described below with the aid of Examples which should not be regarded as limiting.

EXAMPLE 1

Preparation of a Polyaluminosilazane having an Si/Al Ratio of 2:1

Condensation of $AlH_3$ etherate and $Si(NHCH_3)_4$ (TMAS) in diethylene glycidedimethylether (diglyme)

Equation

Active Monomer  Monomer

-continued

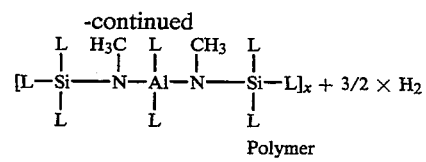
Polymer

L means half a bridging $-NCH_3$-group or a methylamino group.

Reaction Mixture 5 g $AlH_3 \cdot O0.3Et_2O = 95.8$ mmol
28.3 g TMAS $= 292.6$ mmol
500 ml diglyme dehydrated over Na Apparatus for Experiment 1000 ml three-necked flask, 500 ml dropping funnel with pressure equalisation, bubble counter, magnetic stirrer, Dewar with EtOH dry ice, inlet for argon Method The apparatus is heated and flooded with argon. 28.3 g TMAS in 300 ml diglyme are added dropwise to a suspension of 5 g of aluminium hydride etherate in 200 ml diglyme with stirring at $-78°$ C. The reaction mixture is left to warm up to room temperature for 12 hours and then stirred for a further 24 hours. It is then refluxed at $180°$ C. for 3 hours. The solvent is drawn off under vacuum.

Result 29.8 g soluble aluminosilazane polymer, whitish yellow (89%)

Analysis

Infrared spectrum (IR):3420,s, cm$^{-1}$, (N—H); 2920,s, 2890,s, cm$^{-1}$, (C—H); 2625,w, cm$^{-1}$, (N—H); 1465,m, 1380,m, cm$^{-1}$, (C—H); 1185,m, cm$^{-1}$(N—C), 1050,ss, cm$^{-1}$, (Si—N); 1050,ss, cm$^{-1}$, (Al—N); 450,m, cm$^{-1}$; (Si—N; 450,m, cm$^{-1}$, (Al—N).

Powder Diffractogram (XRD) Amorphous

Energy Dispersive X-ray Analysis (EDX) homogeneous polymer, Al—Si ratio 1:2

EXAMPLE 2

Pyrolysis of the Polyaluminosilazane having an Si/Al ratio of 2:1

Equation

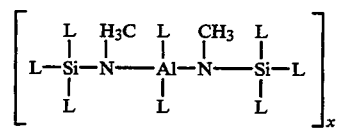
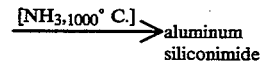

L means half a bridging $-NCH_3$-group or a methylamino group

Reaction Mixture 5 g of the polymer from Example 1

Experimental Method

The polymer is pyrolysed in a stream of ammonia at $1000°$ C. for 12 hours.

Result 3.2 g of a light-grey, amorphous powder are obtained. This corresponds to a ceramic yield of 64%.

Analysis: IR: 3400,w, cm$^{-1}$, (N—H); 1040,ss, cm$^{-1}$, (Si—N); 1040,ss, cm$^{-1}$, (Al—N); 460,m, cm$^{-1}$,δ(Si—N); 460,m, cm$^{-1}$, δ(Al—N).

XRD: Amorphous

EDX: homogeneous distribution of elements at least down to a resolution of 0.5 -μm.

EXAMPLE 3

Preparation of a Polyaluminosilazane having an Si/Al Ratio of 1:1

Condensation of AlH3*2NMe3 and Si(NHCH3)4 (TMAS) in NEt3

Equation

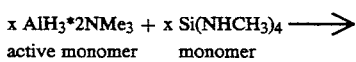
active monomer    monomer

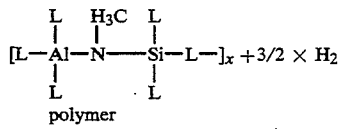
polymer

L means half a bridging —NCH3-group or a methylamino group.

Reaction Mixture 5 g AlH3*2NMe3 = 337 mmol
5 g TMAS = 337 mmol
400 ml triethylamine dehydrated over KOH Experimental Apparatus 1000 ml three-necked flask, 400 ml dropping funnel with pressure equalisition, bubble counter, magnetic stirrer, Dewar with EtOH dry ice, argon inlet.

Experimental Method

The apparatus is heated and flooded with argon. 5 g TMAS in 200 ml triethylamine are added dropwise to a solution of 5 g of aluminium hydride/trimethylamine complex in 200 ml of triethylamine with stirring at −78° C. The reaction mixture is left to warm up to room temperature for 12 hours and is then stirred for a further 6 hours. The solvent is drawn off under vacuum.

Result 5.5 g soluble aluminosilazane polymer, white (93% yield)

Analysis: IR: 3320, w, cm$^{-1}$, (N—H); 2880,s, 2800,s, cm$^{-1}$, (C—H); 1610,w, cm$^{-1}$, δ(N—H); 1465,m, 1375,m, cm$^{-1}$, δ(C—H); 1165,w, cm$^{-1}$, (N—C); 1050, ss, cm$^{-1}$, (Si—N); 1050,ss, cm$^{-1}$, (Al—N); 450,m, cm$^{-1}$, δ(Si—N); 450, m, cm$^{-1}$, δ(Al—N).

XRD: Amorphous

EDX: homogeneous polymer, Al—Si ratio 1:1

EXAMPLE 4

Pyrolysis of the Polyaluminosilazane having an Si/Al Ratio of 1:

Equation

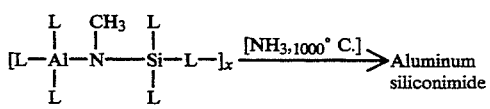

L means half a bridging —NCH3-group or a methylamino group.

Reaction Mixture 5 g of the polymer from Example 3

Experimental Method

The polymer is polymerised in a stream of ammonia at 1000° C. for 12 hours.

Result 3.4 g of a white, amorphous powder are obtained.

This corresponds to a ceramic yield of 68%.

Analysis: IR: 3320,w, cm$^{-1}$, (N—H); 1060,ss, cm$^{-1}$, (Si—N); 1060,ss, cm$^{-1}$, (Al—N); 460,m, cm$^{-1}$, δ(Si—N); 460,m, cm$^{-1}$, δ(Al—N).

XRD: amorphous

EDX: homogeneous distribution of elements at least down to a resolution of 0.5 μm.

EXAMPLE 5

Preparation of a Polyaluminosilazane having an Si/Al Ratio of 4:1

Condensation of AlH3*2NMe3 and Si(NHCH3)4 (TMAS) in toluene

Equation

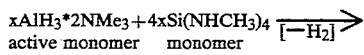
active monomer    monomer

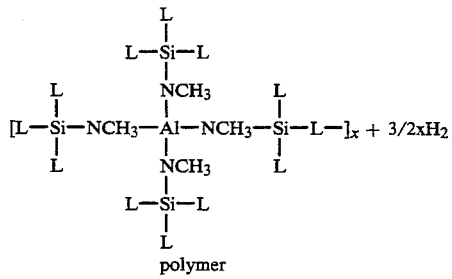
polymer

L means half a bridging —NCH3-group or a methylamino group.

Reaction Mixture 2.5 g AlH3* 2NMe3 = 169 mmol
10 g TMAS = 674 mmol
400 ml toluene dehydrated over KOH Experimental Apparatus 1000 ml three-necked flask, 500 ml dropping funnel with pressure equalisation, bubble counter, magnetic stirrer, Dewar with EtOH dry ice, argon inlet.

Experimental Method

The apparatus is heated and flooded with argon. 10 g TMAS in 200 ml of toluene are added dropwise with stirring to a solution of 2.5 g of aluminium hydride/trimethylamine complex in 200 ml of toluene at −78° C. The reaction mixture is left to warm up to room temperature for 12 hours and then stirred for a further 6 hours. The solvent is drawn off under vacuum.

Result 11.2 g soluble aluminosilazane polymer, colourless (95% yield).

Analysis:IR: 3340, s, cm$^{-1}$, (N—H); 2920,s, 2800, m, cm$^{-1}$, (C—H); 1550, w, cm$^{-1}$, δ(N—H); 1460, w, cm$^{-1}$, δ(C—H); 1020, ss, cm$^{-1}$, (Si—N); 1020, ss, cm$^{-1}$, (Al—N); 450, m, cm$^{-1}$, δ(Si—N); 450, m, cm$^{-1}$, δ(Al—N).

XRD: amorphous

EDX: homogeneous polymer, Si/Al-ratio 4:1 at least down to a resolution of 0.5 μm.

EXAMPLE 6

Pyrolysis of the Polyaluminosilazane having an Si/Al Ratio of 4:1

Equation

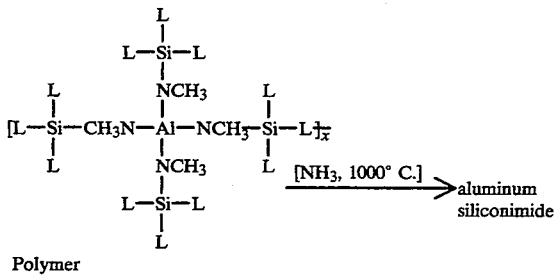

Polymer $\xrightarrow{[NH_3,\ 1000°\ C.]}$ aluminum siliconimide

L means half a bridging —NCH$_3$-group or a methylamino group.

Reaction Mixture
5 g of the polymer from Example 5
Experimental Method
The polymer is pyrolysed in a stream of nitrogen at 1000° C. for 12 hours.
Result
3.2 g of a white, amorphous powder are obtained. This corresponds to a ceramic yield of 64%

Analysis: IR: 3260,w, cm$^{-1}$, (N13 H); 1040,ss, cm$^{-1}$, (Si—N); 1040,ss, cm$^{-1}$, (Al—N); 470,m, cm$^{-1}$, δ(Si—N); 470,m, cm$^{-1}$, δ(Al—N).

XRD: amorphous
EDX: homogeneous distribution of elements at least to a resolution of 0.5 μm.

EXAMPLE 7

Preparation of a Polyborosilazane having an Si/B Ratio of 2:1

Condensation of BH$_3$ and TMAS in toluene
Equation

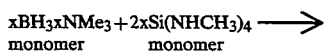

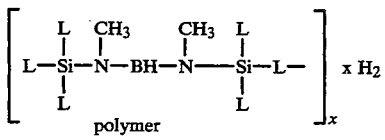

L means half a bridging —NCH$_3$-group or a methylamino group.

Reaction Mixture
1.41 g BH$_3$*NMe$_3$ = 19.4 mmol
22.96 g TMAS = 155.2 mmol
500 ml toluene dehydrated over Na
Experimental Apparatus
1000 ml three-necked flask, 250 ml dropping funnel with pressure equalisation, bubble counter, argon inlet, magnetic stirrer.
Experimental Method
The apparatus is heated and flooded with argon. A solution of 1.41 g of borane-trimethylamine complex in 100 ml of toluene is added dropwise with stirring to 22.96 g of TMAS in 400 ml of toluene at room temperature over a period of 30 min. Stirring is continued for 24 hours at room temperature and the reaction mixture is then refluxed for 3 hours. The solvent is drawn off under vacuum.
Result
7.4 g soluble borosilazane polymer, white (yield 94%).

Analysis: IR: 3440 cm$^{-1}$, (N—H; 2890, 2810 cm$^{-1}$, (C—H; 2370 cm$^{-1}$, (B—H); 1600 cm$^{-1}$, δ(N—H); 1460 cm$^{-1}$, δ(C—H); 1210 cm$^{-1}$, (N—C); 1360 cm$^{-1}$, (B—N); 1090, 940 cm$^{-1}$, (Si—N); 800, 470 cm$^{-1}$δ(Si—N); cm$^{-1}$.

XRD: amorphous

EXAMPLE 8

Pyrolysis of the polyborosilazane having an Si/B ratio of 2:1

Equation

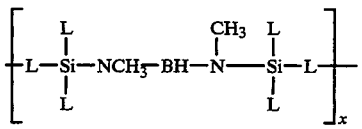

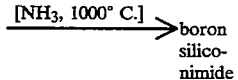 boron siliconimide

L means half a bridging —NCH$_3$-group or a methylamino group.

Reaction Mixture
5 g of the polymer from Example 7
Experimental Method
The polymer is pyrolysed in a stream of ammonia at 1000° C. for 12 hours.
Result
2.7 g of a white, amorphous powder are obtained. This corresponds to a ceramic yield of 54%.

Analysis: IR: 3400 cm$^{-1}$, (NH); 2200 cm$^{-1}$, (B—H); 950 cm$^{-1}$, (Si—N); 1350 cm$^{-1}$, (B—N); 460 cm$^{-1}$, δ(Si—N);

XRD: amorphous

EXAMPLE 9

Preparation of a Polyborosilazane having an Si/B Ratio of 1:1

Condensation of BH$_3$*NMe$_3$ and Si(NHCH$_3$)$_4$(TMAS) in THF
Equation

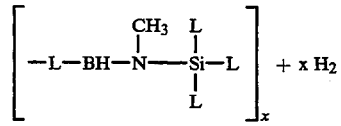

L means half a bridging —NCH$_3$-group or a methylamino group.

Reaction Mixture
2.45 g BH$_3$*NMe$_3$ = 337 mmol
5 g TMAS = 337 mmol
400 ml THF, dehydrated over Na
Experimental Apparatus
1000 ml three-necked flask, 500 ml dropping funnel with pressure equalisation, bubble counter, magnetic stirrer, Dewar with EtOH dry ice, argon inlet.
Experimental Method
The apparatus is heated and flooded with argon. 5 g TMAS in 200 ml THF are added dropwise with stirring to a solution of 2.45 g of borane/trimethylamine complex in 200 ml THF at −78° C. The reaction mixture is left to warm up to room temperature for 12 hours and stirring is continued for a further 6 hours. The solvent is drawn off under vacuum.

Result 5.1 g of soluble borosilazane polymer, white (96% yield).

Analysis: IR: 3440 cm$^{-1}$, (N—H); 2890, 2810 cm$^{-1}$, (C—H); 2360 cm$^{-1}$, (B—H); 1600 cm$^{-1}$, δ(N—H); 1460 cm$^{-1}$, δ(C—H); 1210 cm$^{-1}$, (N—C); 1360 cm$^{-1}$, (B—N); 1090, 1050 cm$^{-1}$, δ(Si—N); 800, 450 cm$^{-1}$, (Si—N); cm$^{-1}$.

XRD: amorphous

EXAMPLE 10

Pyrolysis of the Condensation Product of BH$_3$*NMe$_3$ and Si(NHCH$_3$)$_4$ (TMAS)

Equation

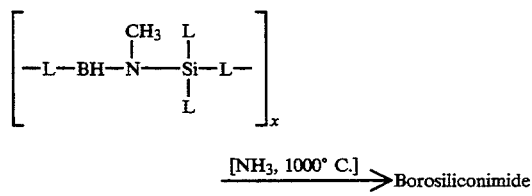

[NH$_3$, 1000° C.] → Borosiliconimide

L means half a bridging —NCH$_3$-group or a methylamino group.

Reaction Mixture 5 g of the polymer from Example 9

Experimental Method

The polymer is pyrolysed in a stream of ammonia at 1000° C. for 12 hours.

Result 3.0 g of a white, amorphous powder are obtained. This corresponds to a ceramic yield of 60%.

Analysis: IR: 3400 cm$^{-1}$, (N—H); 2200 cm$^{-1}$, (B—H); 950 cm$^{-1}$, (Si—N); 1350 cm$^{-1}$, (B—N); 460cm$^{-1}$, δ(Si—N);

XRD: amorphous

What is claimed is:

1. Polymeric aluminosilazanes corresponding to the general structural formula

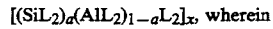 [(SiL$_2$)$_a$(AlL$_2$)$_{1-a}$L$_2$]$_x$, wherein a=0–1
wherein
L means half a bridging —NR— group or an organoamino (—NR) group, in which each Si or Al atom is coordinated by four nitrogen atoms, characterised in that each nitrogen atom carries an organic radical R wherein R=C$_1$-C$_6$-alkyl, vinyl or phenyl and x stands for values greater than five.

2. Polymeric aluminosilazanes according to claim 1, characterised in that the aluminosilazanes have a chloride content of <20 ppm.

3. Polymeric borosilazanes corresponding to the general structural formula

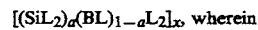 [(SiL$_2$)$_a$(BL)$_{1-a}$L$_2$]$_x$, wherein a=0–1
wherein
L means half bridging —NR-group or an organoamino (—NR) group when L is attached to a silicon atom,
and wherein
L means hydrogen, half a bridging —NR— group or an organoamino (—NR) group when L is attached to a boron atom,
in which each Si atom is triply coordinated by four nitrogen atoms and each B atom by at least two nitrogen and at most one hydrogen atom, characterised in that each nitrogen atom carries an organic radical R wherein R=C$_1$-C$_6$-alkyl, vinyl or phenyl, and x stands for values greater than five, said polymeric borosilazanes having a chloride content of <20 ppm.

4. A process for the preparation of the polymeric aluminosilazanes according to claim 1, wherein a tetrakisorganoaminosilane of the formula Si (NHR)$_4$ wherein R=C$_1$-C$_6$-alkyl, vinyl or phenyl is condensed with an AlH$_3$ component in an organic solvent with elimination of H$_2$.

5. A process according to claim 4, wherein the AlH$_3$ component used is a compound of the formula AlH$_3$*Y wherein Y is a Lewis base.

6. A process for the preparation of the polymeric borosilazanes according to claim 3, wherein a tetrakisorganoamino-silane of the formula Si(NHR)$_4$ wherein R=C$_1$-C$_6$-alkyl, vinyl or phenyl is condensed with a BH$_3$ component in an organic solvent with elimination of H$_2$.

7. A process according to claim 6, wherein the BH$_3$ component used is a complexly bound borane component BH$_3$*Y wherein Y is a Lewis base.

8. A method of using the polymeric aluminosilazanes according to claim 1 comprising pyrolyzing said polymeric aluminosilazanes in an inert atmosphere containing N$_2$ or NH$_3$ temperatures of from 600° to 2000° C.

9. A method of using the polymeric aluminosilazanes of claim 1 comprising pyrolyzing said polymeric aluminosilazanes in an inert atmosphere containing N$_2$ or NH$_3$ at temperatures of from 600° to 2000° C. to form ceramic fibers or ceramic coatings on a substrate, wherein said ceramic fibers or ceramic coatings consist essentially of Si, Al, N and C atoms.

10. The process of claim 5 wherein said Lewis base is at least, one compound selected from the group consisting of S(CH$_3$)$_2$, N(CH$_3$)$_3$, C$_5$H$_5$N, S(C$_2$H$_5$)$_2$, P(CH$_3$)$_3$, AsPh$_3$, tetrahydrofuran, O(CH$_3$)$_2$, O(C$_2$H$_5$)$_2$ and CNCH$_3$.

11. The process of claim 7, wherein said Lewis base is at least one compound selected from the group consisting of S(CH$_3$)$_2$, N(CH$_3$)$_3$, C$_5$H$_5$N, S(C$_2$H$_5$)$_2$, P(CH$_3$)$_3$, AsPh$_3$, tetrahydrofuran, O(CH$_3$)$_2$, O(C$_2$H$_5$)$_2$ and CNCH$_3$.

12. A method of using the polymeric borosilazanes according to claim 3, comprising pyrolyzing said polymeric borosilazanes in an inert atmosphere containing N$_2$ or NH$_3$ at temperatures of from 600° to 2000° C.

13. A method of using the polymeric aluminosilazanes of claim 1 comprising pyrolyzing said polymeric aluminosilazanes in an inert atmosphere containing N$_2$ or NH$_3$ at temperatures of from 600° to 2000° C. to form ceramic fibers or ceramic coatings on a substrate.

14. A method of using the polymeric aluminosilazanes of claim 3 comprising pyrolyzing said polymeric borosilazanes in an inert atmosphere containing N$_2$ or NH$_3$ at temperatures of from 600° to 2000° C. to form ceramic fibers or ceramic coatings on a substrate.

15. A method of using the polymeric borosilazanes of claim 3 comprising pyrolyzing said polymeric borosilazanes in an inert atmosphere containing N$_2$ or NH$_3$ at temperatures of from 600° to 2000° C. to form ceramic fibers or ceramic coatings consisting essentially of Si, Al, N and C atoms.

* * * * *

UNITED STATES PATENT AND TRADEMARK OFFICE
CERTIFICATE OF CORRECTION

PATENT NO. : 5,405,982
DATED : April 11, 1995
INVENTOR(S) : Loffelholz et al.

It is certified that error appears in the above-indentified patent and that said Letters Patent is hereby corrected as shown below:

On the Title Page, item [56], under Other Publications "References Cited" insert Journal of American Ceramic Society, Vol. 64, No. 7, July 1981, High/Low Modulus $Si_3N_4BN$ Composite for Improved Electrical and Thermal Shock Behavior, Mazdiyasni and Ruh, pages 415-419.

Signed and Sealed this

Twenty-first Day of May, 1996

Attest:

BRUCE LEHMAN

*Attesting Officer*  *Commissioner of Patents and Trademarks*